United States Patent [19]

Aoki et al.

[11] Patent Number: 4,760,389
[45] Date of Patent: Jul. 26, 1988

[54] TRANSMITTING TYPE DISPLAY DEVICE

[75] Inventors: Shigeo Aoki, Habikino; Yasuhiro Ukai; Masaru Yasui, both of Yao, all of Japan

[73] Assignee: Hosiden Electronics Co. Ltd., Tokyo, Japan

[21] Appl. No.: 932,839

[22] Filed: Nov. 20, 1986

[30] Foreign Application Priority Data

Nov. 27, 1985 [JP] Japan .................. 60-266636

[51] Int. Cl.$^4$ ............ G03B 21/14; G02B 27/00; G09G 3/36; G02F 1/135
[52] U.S. Cl. .................. 340/719; 340/702; 340/784; 340/793; 350/345
[58] Field of Search ............ 340/702, 78.4, 719, 340/793; 350/345

[56] References Cited

U.S. PATENT DOCUMENTS

| | | | |
|---|---|---|---|
| 3,849,979 | 11/1974 | Tanji | 340/336 |
| 4,104,627 | 8/1978 | Thuler | 350/345 |
| 4,114,366 | 9/1978 | Renner et al. | 315/156 |
| 4,254,408 | 1/1981 | Kerschner, III | 340/380 |
| 4,289,383 | 9/1981 | Schwarzschild | 350/345 |
| 4,294,524 | 10/1981 | Stolov | 358/60 |
| 4,311,996 | 1/1982 | Nakamura et al. | 340/719 |
| 4,319,237 | 3/1982 | Matsuo et al. | 340/784 |
| 4,502,761 | 3/1985 | Knoll et al. | 350/345 |
| 4,644,338 | 2/1987 | Aoki | 340/719 |

FOREIGN PATENT DOCUMENTS 3442498  5/1986  Fed. Rep. of Germany ...... 350/345

Primary Examiner—Howard A. Birmiel
Attorney, Agent, or Firm—Pollock, VandeSande and Priddy

[57] ABSTRACT

A transmitting type display device is disclosed, which comprises a transmitting type display panel to provide a display on the front surface, a light source for producing light illuminating the back surface of the transmitting type display and a brightness controller for controlling the intensity of light from the light source. The device comprises an ambient light detector disposed near the transmitting type display panel for detecting the intensity of ambient light incident on the display surface of the transmitting type display panel, and the brightness controller for controlling the light source according to the detection output of the ambient light detector such that the intensity of light from the light source to the transmitting type display panel is increased with an increase of the detected light intensity.

6 Claims, 2 Drawing Sheets

TRANSMITTING TYPE DISPLAY DEVICE

BACKGROUND OF THE INVENTION

This invention relates to a transmitting type display device which comprises a transmitting type display panel, such as a transmitting type liquid crystal display panel, illuminated by a built-in light source from the back side to produce a display on the front surface.

In a prior art transmitting type display device, which is provided with no means for controlling the brightness of a built-in light source illuminating the back surface of a display panel, one can see the display on the display panel either easily or with difficulty depending on the intensity of light incident on the front surface of the display panel, i.e., ambient light.

For this reason, brightness control means is provided which controls the brightness of light incident on the back surface of the display panel. In the prior art, however, the brightness control is carried out manually. It is cumbersome, however, to make manual control according to changes in the ambient light or changes in the brightness of a built-in light source.

SUMMARY OF THE INVENTION

An object of the invention is to provide a transmitting type display device accommodating therein a light source, which can provide a satisfactory display at all times without need of manual control of the brightness of light incident on the back surface of a display panel irrespective of external light variations.

Another object of the invention is to provide a transmitting type display device which can provide a satisfactory display at all times irrespective of deterioration of the light source.

According to the invention, an ambient light detector for detecting the intensity of ambient light is provided near the display surface of the transmitting type display panel, and the brightness of light incident on the back surface of the transmitting type display panel is controlled by a brightness controller according to the detection output of the ambient light detector. Therefore, when the intensity of the ambient light is increased, i.e., when the space surrounding the device becomes brighter, the brightness of light incident on the back surface of the transmitting type display panel is increased. Thus, one can see the display on the transmitting type display panel always satisfactorily irrespective of changes in the ambient light.

Further, the intensity of light incident on the back surface of the transmitting type display panel is detected by a back surface light detector. When the intensity of light incident on the back surface of the transmitting type display panel is reduced and becomes insufficient due to such cause as deterioration of the light source in long term use while the ambient light intensity is constant, the brightness of light from the light source is automatically increased to make up for the change, so that a satisfactory display is obtained at all times.

The ambient light detector and back surface light detector can be formed on a transparent substrate of the transmitting type display panel simultaneously with the switching elements thereof.

DETAILED DESCRIPTION OF THE PREFERRED EMBODIMENT

Figure 1:
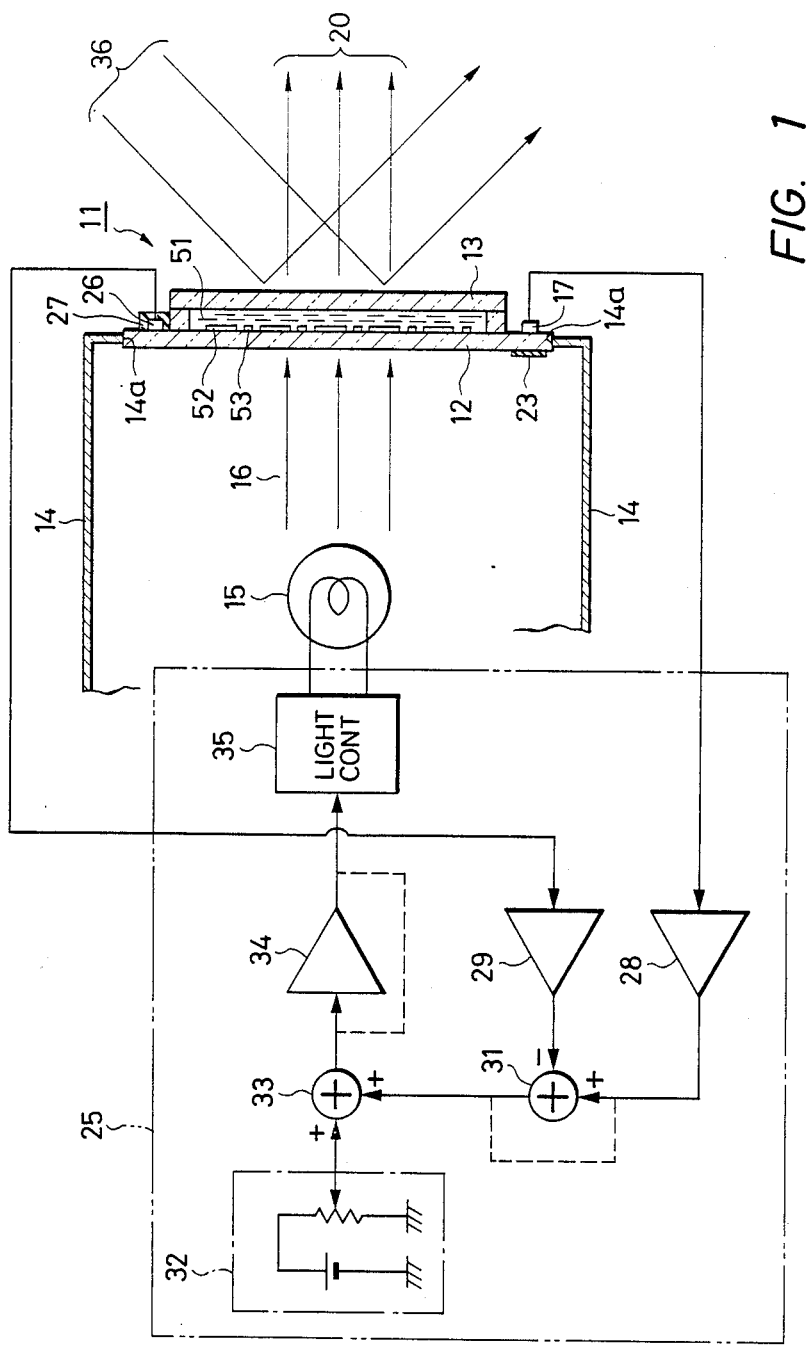
FIG. 1 is a block diagram with a schematic sectional view showing an essential part of the transmitting type display device according to the invention.

FIG. 1 shows an embodiment of the transmitting type display device according to the invention. The illustrated device includes a transmitting type display panel 11, which may be an active matrix type liquid crystal display panel. The display panel consists of rear and front transparent substrates 12 and 13 and a liquid crystal 51 sealed therebetween. The rear and front substrates 12 and 13 and liquid crystal 51 constitute a liquid crystal cell. Pixel electrodes 52 are formed in a matrix array on the inner surface of the rear transparent substrate 12. Also, thin-film transistors 53 are formed as switching elements on the same surface for selecting the respective pixel electrodes. The transmitting type display panel 11 is mounted in a housing 14 so as to close a front opening 14a thereof. Although not shown, the housing 14 is of a light blocking type, i.e., it blocks external light, except for light incident to the display panel 11. A light source 15 is accommodated in the housing 14 such that light from the light source illuminates the back surface of the display panel 11. A display on the display panel 11 can be seen from the front side due to transmitted light 20.

Figure 2:
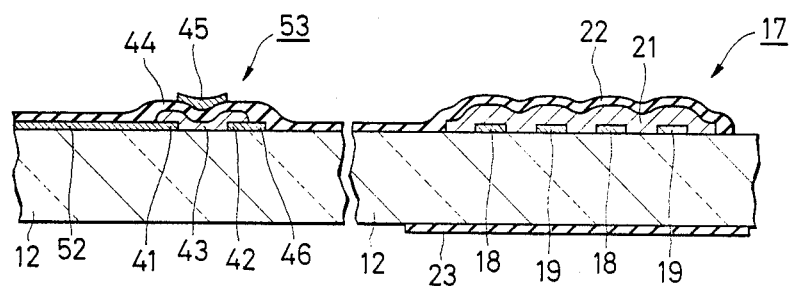
FIG. 2 is a fragmentary enlarged-scale sectional view showing an ambient light detector 17 and a thin film transistor 53.
Figure 3:
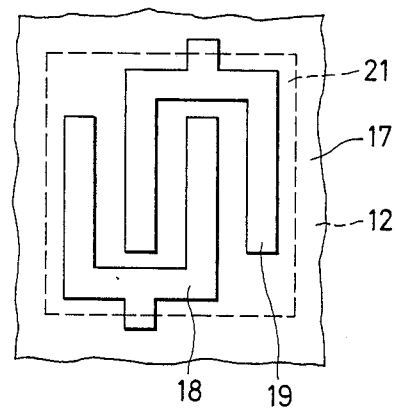
FIG. 3 is a plan view showing the ambient light detector 17 of FIG. 2 with a protective insulating layer 22 removed.

According to the invention, an ambient light detector 17 is provided near the display surface of the transmitting type display panel 11 for detecting the intensity of ambient light. In the illustrated embodiment, the detector 17 is formed on the surface of a portion of the rear transparent substrate 12 projecting from a marginal side of the front transparent substrate 13, the abovesaid surface being on the side of the front substrate 13, on which side the thin-film transistors 53 of the liquid crystal display panel are formed. FIGS. 2 and 3 show the ambient light detector 17. As is shown, the detector 17 includes a pair of comb-like electrodes 18 and 19 formed in an interlaced arrangement on the rear transparent substrate 12, which may be glass, and also includes an amorphous silicon layer 21 or like photoconductive layer formed to cover the comb-like electrodes 18 and 19 and a transparent protective insulating film 22 of silicon nitride formed on the layer 21. The components of the detector 17, i.e., electrodes 18 and 19 and layers 21 and 22, may be formed simultaneously with the formation of the thin-film transistors 53 on the rear transparent substrate 12 of the liquid crystal cell as will be explained later. A light-blocking layer 23 is formed on the back surface of the rear transparent substrate 12 such that it faces the ambient light detector 17. It serves to block light from the back side.

The basic configuration of transmitting type liquid crystal panel of the type described above is disclosed in the specification of Aoki et al U.S. patent application Ser. No. 812,885 filed on Dec. 4, 1985 (PCT Publication No. WO 85/4731). In the manufacture of this liquid crystal panel, pixel electrodes 52, drain electrodes 41 connected thereto, source electrodes 42 positioned close to the respective drain electrodes 41 and source buses 46 connected to the source electrodes 42 are formed from a transparent conductive film of such as ITO on the inner surface of one of the transparent substrates as illustrated in FIG. 2. Then, a semiconductor layer 43 of amorphous silicon is formed on the rear substrate 12 such that it strides each drain electrode 41 and a corresponding source electrode 42. Subsequently, a gate insulating film 44 is formed on the semiconductor layer 43, and a gate electrode 45 is formed on the gate insulating film 44. In this way, the thin-film transistors 53 are formed. According to the present invention, when forming the thin-film transistors 53 on the rear transparent substrate 12, the comb-like electrodes 18 and 19 are formed together with the pixel electrodes 52 and drain and source electrodes 41, 42, 46, the amorphous silicon layer 21 is formed together with the semiconductor layers 43, and the protective insulating layer 22 is formed together with the gate insulating films 44. In this way, the ambient light detector 17 may be formed without need of any separate process additional to the process for formation of the thin-film transistors 53.

Referring back to FIG. 1, a brightness controller 25 is controlled according to the detection output of the ambient light detector 17 such that the brightness of light incident on the back surface of the transmitting type display panel 11 is increased with increasing ambient light intensity. In this embodiment, the intensity of light 16 incident on the back surface of the transmitting type display panel 11 is detected by a back light detector 26, and the detection output thereof is also used to control the brightness of the light source 15. The back light detector 26 is formed on the front surface of a projecting portion of the transparent substrate 12, and a light-blocking layer 27 is formed over the detector 26 to block light from the front side, whereby light transmitted through the rear transparent substrate 12 from the back side thereof and reaching the back light detector 26 is detected. The back light detector 26 may be formed in the same manner as the ambient light detector 17 as described before in connection with FIGS. 2 and 3.

The outputs of the ambient light detector 17 and back light detector 26 are amplified by respective preamplifiers 28 and 29, the output of the former is subtracted by the output of the latter at an adder 31. The output of the adder 31 is fed to an adder 33 to be added to a reference brightness signal from a reference brightness setter 32. The sum output of the adder 33 is fed, after amplification through a feedback amplifier 34, to a light controller 35. The light source 15 is controlled according to the output of the light controller 35. In this case, the reference brightness setter 32 is set such that a proper brightness of display is obtained when there is substantially no ambient light. The output polarity of the preamplifier 28 and reference brightness setter 32 is set to be positive, and the output polarity of the preamplifier 29 is set to be negative. Thus, the brightness controller 25 performs a feedback operation such that the sum of the outputs of the preamplifier 28 and reference brightness setter 32 is substantially equal in magnitude to the output of the preamplifier 29.

In the above construction, when the intensity of light incident on the transmitting type display panel 11 is increased, that is, when the space surrounding the device becomes brighter, the outputs of the ambient light detector 17 and adders 31 and 33 are increased to increase the brightness of light of the light source 15, that is, the intensity of the transmitted light 20 is increased. Thus, one can easily see the display.

When the space surrounding the device becomes darker, the transmitted light 20 seems brighter and the output of the ambient light detector 17 is reduced. Accordingly, the intensity of light of the light source 15 is thus reduced to such an extent that the readiness of seeing the display is not spoiled. Power consumption at the light source 15 thus can be reduced, lowering the intensity of light 16 from the light source 15 so that one can readily see the display.

In this embodiment, the back light detector 26 is provided, and its output is used for negative feedback control. More specifically, when the intensity of light 16 of the light source 15 is varied due to variations of the characteristics of the light source 15, feedback amplifier 34 and light controller 35 due to long use or with changes in the relative humidity or temperature, the variation is detected by the back light detector 26, and the feedback control circuit functions to cancel the variation. This type of variation is not frequently produced, so that it is possible to omit the back light detector 26, preamplifier 29 and adder 31 while connections are made as indicated by broken lines. In this case, the reference brightness setter 32 may be manually adjusted in accordance with the variation.

In the foregoing, the rear transparent substrate 12 has been described as having a marginal projecting portion, but it is also possible to provide an arrangement wherein the front transparent substrate 13 has a marginal projecting portion on which the ambient light detector 17 and/or the back light detector 26 are formed simultaneously with the formation of thin-film transistors 53 on the inner surface of the front transparent substrate 13.

As has been described in the foregoing, according to the invention even when the brightness of ambient light outside the transmitting type display device is varied greatly, the intensity of light from the inner light source is automatically controlled so that one can readily see the display at all times. Further, where the back light detector 26 is provided for feedback control, satisfactory display can be provided at all times irrespective of great variations of the ambient light intensity. Further, satisfactory display can be obtained automatically irrespective of the deterioration or characteristic variations of the light source and light controller. Further, the ambient light detector 17 and back light detector 26 can be formed simultaneously with the manufacture of the liquid crystal display panel as in the above embodiment.

We claim:

1. A transmitting type display device comprising:
a transmitting type display panel mounted in a housing, said display panel closing an opening in said housing;
a light source disposed within said housing on the back side of said transmitting type display panel for producing light illuminating the back side of said transmitting type display panel;
an ambient light detector disposed near said transmitting type display panel for detecting the intensity of ambient light incident on the display surface of said transmitting type display panel, said ambient light detector being formed on a projecting portion of a transparent substrate of said transmitting type display panel, and a light-blocking layer being formed on said transparent substrate for shielding said ambient light detector from light from said light source; and a brightness controller for controlling said light source according to the outside of said ambient light detector such that the intensity of light from said light source incident on said transmitting type display panel is increased with an increase in the detected ambient light intensity;

said transmitting type display panel being a liquid crystal display panel which includes first and second transparent substrates and a liquid crystal sealed therebetween, pixel electrodes and thin-film transistors for selectively driving said pixel electrodes being formed on the inner surface of said first transparent substrate, said first transparent substrate having said projecting portion projecting therefrom outwards of said second transparent substrate, and said ambient light detector being formed on the same surface of said first transparent substrate on which said thin-film transistors are formed.

2. The transmitting type display device according to claim 1, wherein said thin-film transistors each have source and drain electrodes formed on said first transparent substrate, a semiconductor layer of amorphous silicon formed to stride said source and drain electrodes, a gate insulating layer formed on said semiconductor layer and a gate electrode formed on said gate insulating layer, and said ambient light detector having a pair of comb-like electrodes formed in a mutually interlaced arrangement and of the same material as said source and drain electrodes on said first transparent substrate, an amorphous silicon layer of the same material as said semiconductor layer formed to extend over said comb-like electrodes, and a protective insulating layer of the same material as said gate insulating layer formed on said amorphous silicon layer.

3. The transmitting type display device according to claim 1, which further comprises a back light detector for detecting the intensity of light incident on the back surface of said transmitting type display panel, the output of said back light detector being fed to said brightness controller, whereby said light source is so controlled that the intensity of light incident from said light source on the back surface of said transmitting type display panel is reduced with increasing light intensity detected by said back light detector.

4. The transmitting type display device according to claim 3, wherein said back light detector is formed on said projecting portion of said first transparent substrate and a light-blocking layer is formed on said first transparent substrate for blocking ambient light incident on said back light detector from the front side of said display panel.

5. The transmitting type display device according to claim 4, which further comprises a subtractor means for producing the difference between the detection outputs of said ambient light detector and said back surface light detector, an adder means for producing the sum of the output of said subtractor means and the output of a variable reference brightness setter, and a light control means for controlling said light source according to the output of said adder means.

6. The transmitting type display device according to claim 3, wherein said back light detector is formed in the same configuration as said ambient light detector on the same surface of said first transparent substrate on which said thin-film transistors are formed on, and a second light-blocking layer is formed on that same surface for shielding said back light detector from ambient light.

* * * * *